(12) United States Patent
Durban et al.

(10) Patent No.: US 10,689,491 B2
(45) Date of Patent: Jun. 23, 2020

(54) SILICONE FORMULATIONS FOR 3D PRINTING

(71) Applicant: Lawrence Livermore National Security, LLC, Livermore, CA (US)

(72) Inventors: Matt Durban, Livermore, CA (US); Eric Duoss, Dublin, CA (US); Jeremy Lenhardt, Tracy, CA (US); Thomas S. Wilson, San Leandro, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/721,528

(22) Filed: Sep. 29, 2017

(65) Prior Publication Data

US 2019/0100626 A1    Apr. 4, 2019

(51) Int. Cl.
| | | |
|---|---|---|
| *B33Y 70/00* | (2020.01) | |
| *C08G 77/442* | (2006.01) | |
| *C08G 81/02* | (2006.01) | |
| *C08K 5/00* | (2006.01) | |
| *C08K 5/56* | (2006.01) | |

(Continued)

(52) U.S. Cl.
CPC .......... *C08G 77/442* (2013.01); *B29C 64/106* (2017.08); *B29C 64/112* (2017.08); *B33Y 10/00* (2014.12); *B33Y 70/00* (2014.12); *C07F 7/0879* (2013.01); *C08G 81/024* (2013.01); *C08K 5/0025* (2013.01); *C08K 5/56* (2013.01); *C09D 11/101* (2013.01); *C09D 11/102* (2013.01); *C09D 183/04* (2013.01); *B29K 2083/00* (2013.01); *C08G 77/12* (2013.01); *C08G 77/20* (2013.01); *C08K 3/11* (2018.01);

(Continued)

(58) Field of Classification Search
None
See application file for complete search history.

(56) References Cited

U.S. PATENT DOCUMENTS

| | | | | |
|---|---|---|---|---|
| 6,559,199 B1 * | 5/2003 | Pusineri | ................ | A01N 59/00 264/16 |
| 6,942,830 B2 * | 9/2005 | Mulhaupt | ............. | B29C 31/045 264/255 |

(Continued)

FOREIGN PATENT DOCUMENTS

| | | | | |
|---|---|---|---|---|
| EP | 1433749 A1 * | 6/2004 | ............ | B82Y 30/00 |
| WO | WO-2017081028 A1 * | 5/2017 | ............ | C08L 83/04 |
| WO | WO-2017144461 A1 * | 8/2017 | ............ | C08G 77/12 |

OTHER PUBLICATIONS

Simtec "Reinforcing Fillers in Liquid Silicone Rubber Compounds" 5 pages, 2017. (Year: 2017).*

(Continued)

*Primary Examiner* — Robert S Loewe
(74) *Attorney, Agent, or Firm* — Zilka-Kotab

(57) ABSTRACT

In one embodiment, a silicone-based ink for additive manufacturing includes a vinyl-terminated siloxane macromer, a hydrophobic reinforcing filler, and a rheology modifying additive. In another embodiment, a method of additive manufacturing with silicone-based ink includes adding a mixture that includes a vinyl-terminated siloxane macromer, a hydrophobic reinforcing filler, and a rheology modifying additive to a cartridge for additive manufacturing, extruding the mixture through the cartridge to form a structure, and curing the mixture to at least a predefined extent.

22 Claims, 8 Drawing Sheets

(51) Int. Cl.
<table>
<tr><td>B29C 64/112</td><td>(2017.01)</td></tr>
<tr><td>C07F 7/08</td><td>(2006.01)</td></tr>
<tr><td>C09D 11/102</td><td>(2014.01)</td></tr>
<tr><td>B33Y 10/00</td><td>(2015.01)</td></tr>
<tr><td>C09D 11/101</td><td>(2014.01)</td></tr>
<tr><td>C09D 183/04</td><td>(2006.01)</td></tr>
<tr><td>B29C 64/106</td><td>(2017.01)</td></tr>
<tr><td>G01N 25/48</td><td>(2006.01)</td></tr>
<tr><td>C08K 5/5425</td><td>(2006.01)</td></tr>
<tr><td>C08K 3/11</td><td>(2018.01)</td></tr>
<tr><td>C08G 77/20</td><td>(2006.01)</td></tr>
<tr><td>C08K 9/06</td><td>(2006.01)</td></tr>
<tr><td>B29K 83/00</td><td>(2006.01)</td></tr>
<tr><td>C08G 77/12</td><td>(2006.01)</td></tr>
</table>

(52) U.S. Cl.
CPC .............. *C08K 5/5425* (2013.01); *C08K 9/06* (2013.01); *G01N 25/4866* (2013.01)

(56) References Cited

U.S. PATENT DOCUMENTS

| | | | | |
|---|---|---|---|---|
| 8,333,946 | B2* | 12/2012 | Gottschalk-Gaudig | B82Y 30/00 423/335 |
| 2007/0287771 | A1* | 12/2007 | Yamazaki | C09D 11/30 523/160 |
| 2008/0033071 | A1* | 2/2008 | Irmer | C08L 83/04 522/66 |
| 2009/0018260 | A1* | 1/2009 | Correia | C08G 65/336 524/588 |
| 2009/0062417 | A1* | 3/2009 | Wrobel | C08J 5/00 522/66 |
| 2010/0239871 | A1* | 9/2010 | Scheffer | C09D 7/70 428/447 |
| 2013/0200554 | A1* | 8/2013 | Mueller | C08J 3/24 264/477 |
| 2013/0245181 | A1* | 9/2013 | Friedel | C08K 5/56 524/400 |
| 2014/0356590 | A1* | 12/2014 | Hoffee | C09D 11/102 428/196 |
| 2015/0352782 | A1* | 12/2015 | Lisitsin | C09D 133/14 264/401 |
| 2016/0128909 | A1* | 5/2016 | Fontein | A61K 6/083 523/116 |
| 2016/0198576 | A1* | 7/2016 | Lewis | H01L 23/49822 361/761 |
| 2016/0230005 | A1* | 8/2016 | Mayumi | C08L 83/04 |
| 2016/0244625 | A1* | 8/2016 | Clapp | C08F 283/124 |
| 2017/0039898 | A1* | 2/2017 | Kim | G09F 3/10 |
| 2017/0144368 | A1* | 5/2017 | Bihari | B33Y 70/00 |
| 2017/0225491 | A1* | 8/2017 | Miller | B41J 2/21 |
| 2018/0066115 | A1* | 3/2018 | Achenbach | C08G 77/20 |
| 2018/0186076 | A1* | 7/2018 | Backer | C08L 83/04 |
| 2018/0244854 | A1* | 8/2018 | Drazba | C08G 77/12 |
| 2018/0281276 | A1* | 10/2018 | Milroy | C08L 83/04 |
| 2018/0281294 | A1* | 10/2018 | Gottschalk-Gaudig | B33Y 10/00 |

OTHER PUBLICATIONS

Duoss et al. "Three-Dimensional Printing of Elastomeric, Cellular Architectures with Negative Stiffness" Adv. Funct. Mater. 2014, 24, 4905-4913. (Year: 2014).*
Technical Data Sheet for Aerosil R 9200, 1 page, 2018. (Year: 2018).*
Schmalzer et al. "Gamma radiation effects on siloxane-based additive manufactured structure" Radiation Physics and Chemistry, 2017, 130, 103-11. (Year: 2017).*
Grassie et al. "The Thermal Degradation of Polysiloxanes—Part 4: Poly(dimethyl/diphenyl siloxane)" Polymer Degradation and Stability 2, 1980, 67-83. (Year: 1980).*
Qu et al. "Effect of Diphenylsiloxane Unit Content on Relaxation Behavior of Poly(dinnethylsiloxane-co-diphenylsiloxane)" Journal of Polymer Science: Part B: Polymer Physics, 46, 1652-1659, 2008. (Year: 2008).*
Sylgard 184 Curing agent informaiton, 8 pages, 2014. (Year: 2014).*
Sylgard 184 Base agent information, 8 pages, 2007. (Year: 2007).*
Kopylov et al. "Silica fillers for silicone rubber" Kauchuk i Rezina, 2010, 5, 32-43. (Year: 2010).*
International Search Report and Written Opinion from PCT Application No. PCT/US18/53452, dated Oct. 26, 2018.
International Preliminary Examination Report from PCT Application No. PCT/US2018/053452, dated Apr. 9, 2020.

* cited by examiner

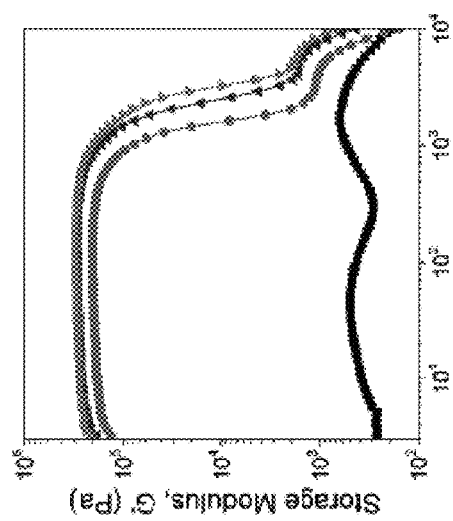
FIG. 3A
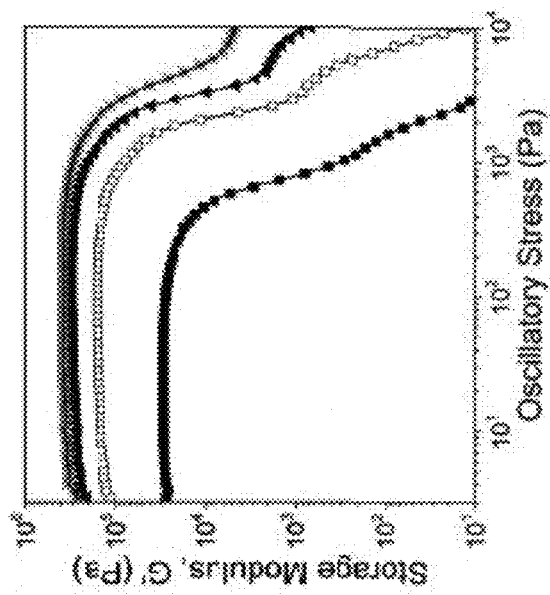
FIG. 3D
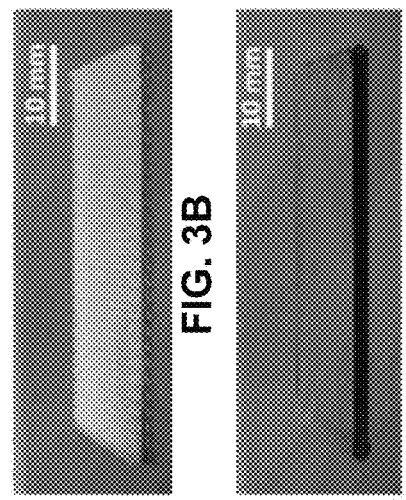
FIG. 3B
FIG. 3C

FIG. 8A
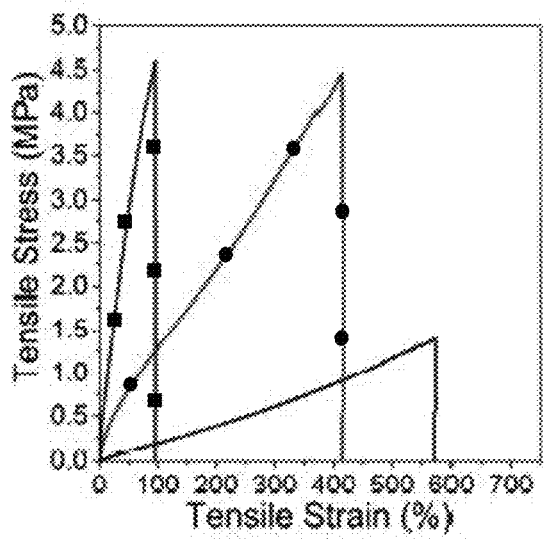
FIG. 8B
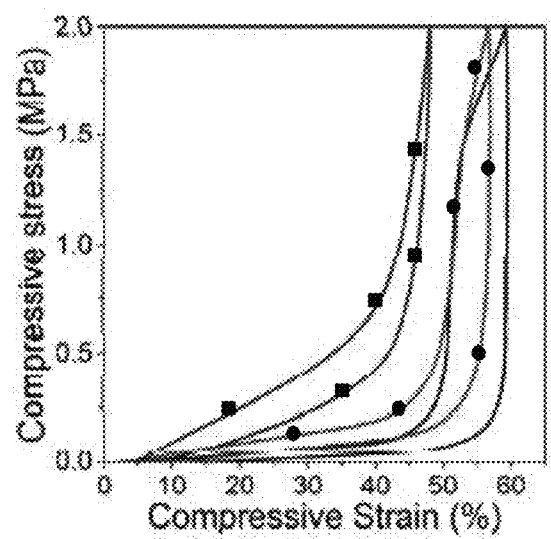
FIG. 8C
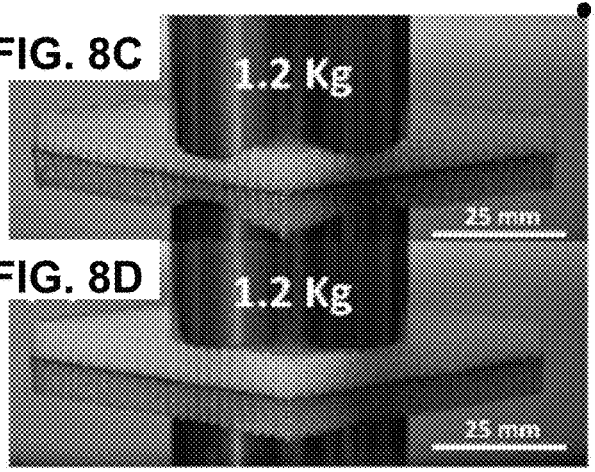
FIG. 8D
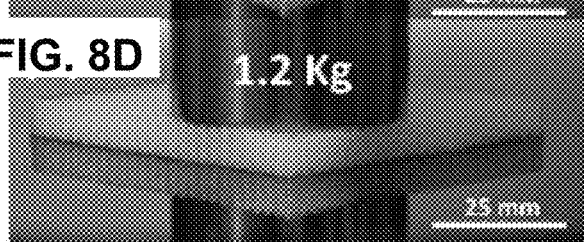
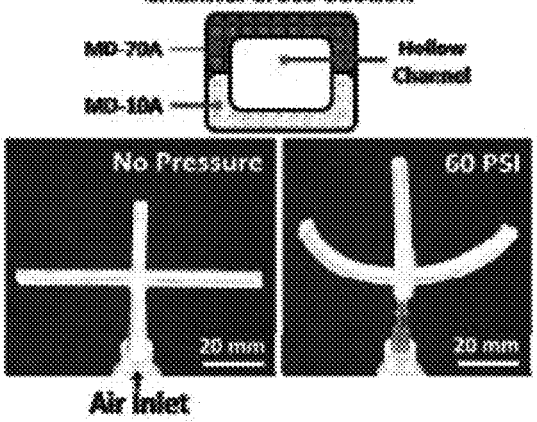
FIG. 8E

SILICONE FORMULATIONS FOR 3D PRINTING

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of silicone materials, and more particularly, this invention relates to silicone-based inks for additive manufacturing and additive manufacturing processes using such inks.

BACKGROUND

The field of three dimensional (3D) printed silicone materials is new and largely unexplored. The flowable nature of liquid silicone materials suggests that silicone material may be used in a direct ink write (DIW) process of additive manufacturing (AM); however, the formation of 3D structures that retain their shape has remained elusive. On the other hand, solid silicone material cannot be used as ink in additive manufacturing because it in unflowable and cannot be extruded from the nozzle during printing. Thus, it would be desirable to create inks for additive manufacturing to form 3D printed parts of silicone material that retain the 3D shape.

SUMMARY

In one embodiment, a silicone-based ink for additive manufacturing includes a vinyl-terminated siloxane macromer, a hydrophobic reinforcing filler, and a rheology modifying additive.

In another embodiment, a method of additive manufacturing with silicone-based ink includes adding a mixture that includes a vinyl-terminated siloxane macromer, a hydrophobic reinforcing filler, and a rheology modifying additive to a cartridge for additive manufacturing, extruding the mixture through the cartridge to form a structure, and curing the mixture to at least a predefined extent.

In yet another embodiment, a product of additive manufacturing with a silicone-based ink includes a vinyl-terminated siloxane macromer, a hydrophobic reinforcing filler, a rheology modifying additive, a curing agent, an inhibitor of the curing agent, and a crosslinking agent.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3A is a plot of oscillatory stress of storage modulus values for silicone-based inks, according to various embodiments.

FIG. 3B is a lattice 8-layer structure formed by a silicone-based ink with rheological additive, according to one embodiment.

FIG. 3C is a lattice 8-layer structure formed by a silicone-based ink without rheological additive, according to one embodiment.

FIG. 3D is a plot of the effect of treated reinforcing silica filler on observed yield stress, according to various embodiments.

FIG. 8A is a plot of tensile stress versus tensile strain, according to various embodiments.

FIG. 8B is a plot of compressive performance, according to various embodiments.

FIGS. 8C and 8D are images of a physical demonstration of stiffness of 3D printed silicone-based lattices, according to various embodiments.

FIG. 8E is a diagram of a 3D-printed air-driven soft robotic actuator, according to one embodiment.

DETAILED DESCRIPTION

Figure 1:
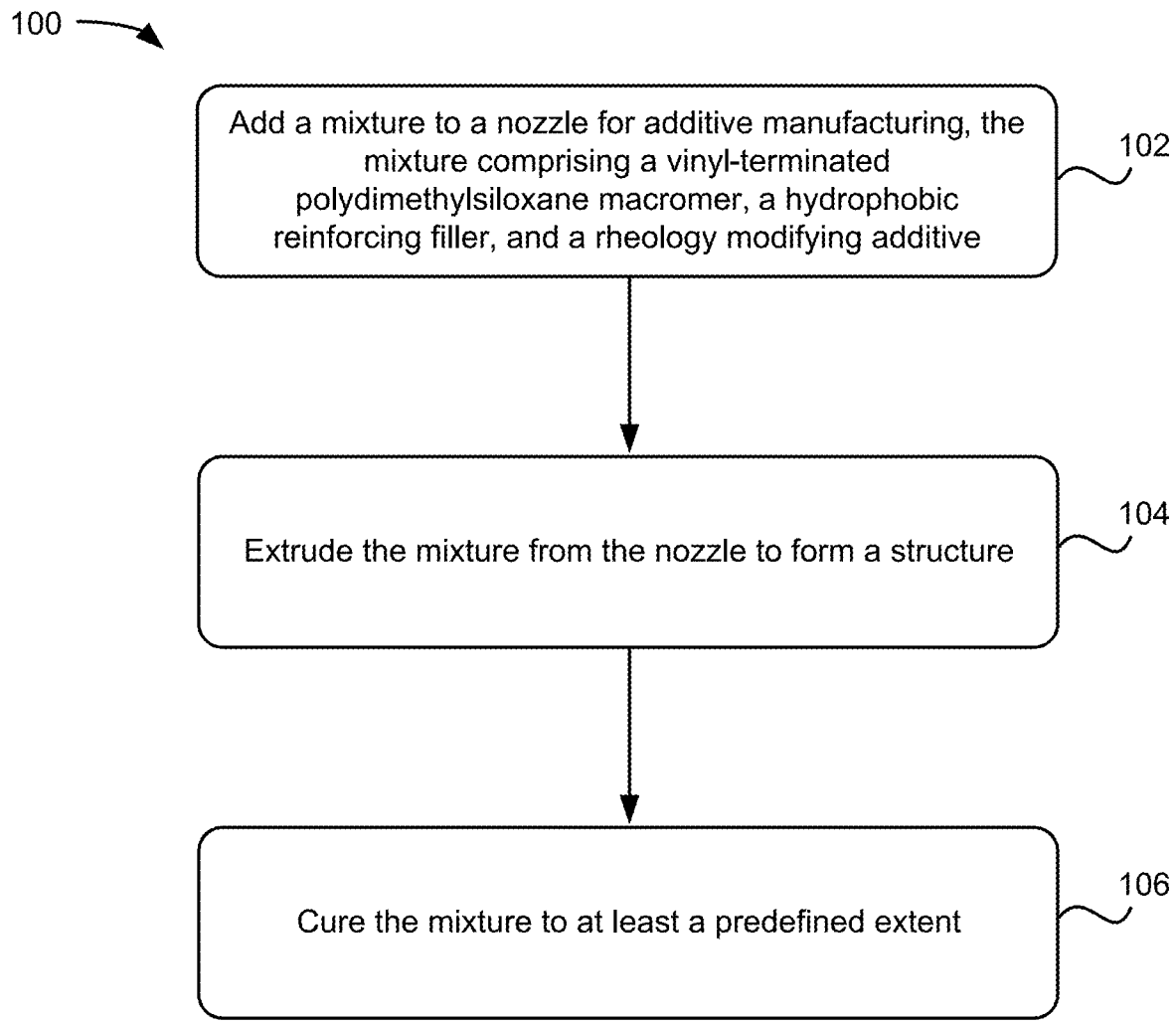
FIG. 1 is a flow chart of a method, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

The following description discloses several preferred embodiments of silicone-based formulations and/or related systems and methods.

In one general embodiment, a silicone-based ink for additive manufacturing includes a vinyl-terminated siloxane macromer, a hydrophobic reinforcing filler, and a rheology modifying additive.

In another general embodiment, a method of additive manufacturing with silicone-based ink includes adding a mixture that includes a vinyl-terminated siloxane macromer, a hydrophobic reinforcing filler, and a rheology modifying additive to a cartridge for additive manufacturing, extruding the mixture through the cartridge to form a structure, and curing the mixture to at least a predefined extent.

In yet another general embodiment, a product of additive manufacturing with a silicone-based ink includes a vinyl-terminated siloxane macromer, a hydrophobic reinforcing filler, a rheology modifying additive, a curing agent, an inhibitor of the curing agent, and a crosslinking agent.

A list of acronyms used in the description is provided below.

3D Three dimensional
AM Additive manufacturing
C Celsius
cSt centiStokes
DIW Direct Ink Writing
DPS diphenylsiloxane
ETCH 1-ethynyl-1-cyclohexanol
FCT face centered tetragonal
g gram
HMDZ hexamethyldisilazane
Pa Pascals
PDMS polydimethylsiloxane
PHMS poly(hydrogenmethylsiloxane)
ppm parts per million
Pt Platinum
W Watt
Wt. % weight percent Inks with a specific rheology used in 3D printing allow the resulting 3D printed structures to retain their shape for an extended period of time before curing.

According to various embodiments, silicone-based inks with appropriate rheological behavior for 3D printing result in printing 3D porous structures with controlled architectures. Various embodiments described herein demonstrate the capability to tune the stiffness of printable silicone materials by controlling the chemistry, network formation, and crosslink density of silicone-based ink formulations in order to overcome the challenging interplay between ink development, post-processing, material properties, and performance. Various embodiments described herein identify materials and methods by which to prepare custom-tailored 3D printable silicone materials through DIW processes.

Moreover, various embodiments described herein demonstrate that through adjustments to the chain lengths of functional silicone-based materials and through the incorporation of reinforcing filler materials, silicones can be prepared with tunable stiffness, unlocking the ability to print functional parts exhibiting anisotropic behavior and properties when printed in tandem or dynamically mixed. Furthermore, custom formulations prepared according to the teaching herein unlock the ability to control the chemistry of silicone-based materials, affecting their aging behavior, material compatibility and biocompatibility, and surface chemistry to impart adhesiveness. Described herein are a series of low temperature stable 3D printable silicones with tunable stiffness developed through a study of silicone rheology, pseudoplasticity, filler loading, and cure inhibition, to facilitate the printing of silicone materials with an extended working lifetime.

Silicone elastomers have broad versatility within a variety of advanced material applications, such as soft robotics, biomedical devices, and metamaterials. However, non-polar silicone materials are not naturally pseudoplastic or thixotropic in which a solid silicone material becomes liquid with applied stress. In would be desirable to develop an ink using non-polar silicone materials so that silicone-based 3D structure may be formed.

In one embodiment, a silicone-based ink for additive manufacturing includes a vinyl-terminated siloxane macromer, a hydrophobic reinforcing filler, and a rheology modifying additive. In some approaches, the vinyl-terminated siloxane macromer may be an oligomeric organosiloxane macromer. In other approaches, the vinyl-terminated siloxane macromer may be a polymeric organosiloxane macromer. In an exemplary approach, the vinyl-terminated siloxane macromer may be a vinyl-terminated polydimethylsiloxane (PDMS) macromer. In some approaches, the vinyl-terminated siloxane macromer may have a viscosity in a range of about 500 centiStoke and about 50,000 centiStoke (cSt).

In one embodiment, a silicone-based ink for additive manufacturing includes a vinyl-terminated polydimethylsiloxane-diphenyl siloxane (DPS) macromer, hydrophobic reinforcing filler, and a rheology modifying additive. In some approaches, a vinyl-terminated PDMS-DPS macromer may have a viscosity in a range of about 500 cSt to about 50,000 cSt.

In some embodiments of the silicone-based ink, the hydrophobic reinforcing filler may be treated silica. In some approaches, the treated silica may have a surface area in a range of about 50 $m^2/g$ to about 250 $m^2/g$. In a preferred approach, the treated silica may have a surface area in a range of about 100 $m^2/g$ to 200 $m^2/g$ for imparting reinforcement while alleviating an increase in viscosity that could obstruct the extrusion process. In some approaches, the treated silica may be hexamethyldisilazane (HMDZ)-treated silica. In other approaches, additional treated silicas with increased hydrophobicity may also be used. In some approaches, a silicone-based ink may include a composite of PDMS-DPS and hydrophobic filler such as HMDZ-treated silica. The hydrophobic reinforcing filler, such as HMDZ-treated silica, may be included to ensure a long-term stability of 3D printed silicone components prior to curing. HMDZ treatment of silica may involve capping the silanol groups of the silica with HMDZ to yield trimethylsilanes and a hydrophobic filler surface.

In some embodiments, fumed silica in the silicone-based ink may be in a range of about 5 wt. % to about 50 wt. % of total composition of the ink, and preferably in a range of about 12 wt % to about 35 wt. % of total composition of the ink. In some approaches, silica fillers with reduced surface area allow an increase degree of silica loading without over-saturating the liquid ink matrix, and thereby resulting in highly stiff printable silicone materials. In some approaches, the effective concentration of fumed silica may be determined from the surface area of the fumed silica using known techniques.

In other approaches, an untreated silanol-containing filler may likely result in crepe hardening (i.e. thickening of uncured silicones) of the silicone under prolonged storage before curing. Moreover, premature hardening of the silicone may yield a progressive increase in material stiffness due in part to condensation reactions between neighboring silanol groups. Furthermore, the use of untreated silica fillers may reduce the mechanical strength and alter the physical properties of silicones. In some cases, untreated silica fillers may retain more moisture than hydrophobic fillers, and thus may be undesirable for long term applications.

In various embodiments, silicone-based inks may be prepared with a proper rheology for 3D printing in which structures with pre-defined dimensions are formed.

In some embodiments, a rheology modifying additive may be added to impart silicone pseudoplasticity. Rheology modifying additives impart thixotropy in silicone materials. A rheology modifying additive may be a thixotropic additive that imparts pseudoplasticity in silicone elastomers. In some approaches, the rheology modifying additive may be a silicone polyether, a methylvinyl siloxane (or dimethyl siloxane), dimethoxy (glycidoxypropyl)-terminated, glycerol, 2-propanol or combinations thereof. In some embodiments, the silicone-based ink may include a rheology modifying additive in a range of about 0.01 wt. % to about 10.0 wt % of total composition, and preferably about 0.2 wt. % to about 1.0 wt. % of total composition.

Without wishing to be bound by any theory, it is believed that the mechanism of pseudoplasticity of a silicone-based ink, according to some embodiments, involves the formation of a stable 3D network between treated-silica filler particles and a rheological modifying additive via hydrogen bonding and potential van der Waals interactions.

In other approaches, a more hydrophilic reinforcing filler such as untreated fumed silica may be incorporated into the silicone-based material to impart thixotropy of the silicone material into solid-like network in the absence of applied stress. The mechanism of pseudoplasticity may be attributed to unreacted silanol groups on the silica surface, thereby allowing for particle associations through hydrogen bonding to form an anti-sagging network exhibiting shape retention behavior.

Embodiments described herein encompass a low-temperature stable silicone-based material with the ideal rheology for 3D printing, which may be custom formulated to yield a wide range of physical properties applicable to a variety of fields and industries. For example, the reinforcing filler may be refractive index-matched to impart a 3D silicone structure with transparent optical-grade properties. According to various embodiments described herein, a wide-range of silicone-based 3D structures of varying hardness and stiffness levels may be prepared from silicone-based materials.

In some embodiments, silicone-based inks may be pseudoplastic, non-Newtonian fluids, capable of being deposited in a layer-by-layer pattern during 3D printing.

In some embodiments, the silicone-based ink may include a curing agent. In some approaches, the curing agent may utilize hydrosilylation chemistry during the curing of the 3D structure, such as a platinum curing agent (e.g., Karstedt Pt catalyst), ruthenium curing agent, iridium curing agent, and/or rhodium curing agent. In some approaches, platinum-catalyzed hydrosilylation chemistry (e.g. platinum catalyzed addition of silanes to alkenes) may be used to cure the structured formed with silicone-based inks. In other approaches, ruthenium-catalyzed hydrosilylation chemistry may be used to cure the structures formed with silicone-based inks. In yet other approaches, iridium-catalyzed hydrosilylation chemistry may be used to cure the structures formed with silicone-based inks. In yet other approaches, rhodium-catalyzed hydrosilylation chemistry may be used to cure the structures formed with silicone-based inks.

In some approaches, it is advantageous to use platinum (Pt)-group metal-catalyzed hydrosilylation chemistry because the process does not generate volatile reaction products as compared to condensation cure reactions that produce byproducts such as acetic acid and ethanol. Moreover, these byproducts could deleteriously contribute to some material shrinkage and deviation from the form of the printed 3D structure as deposited.

In some embodiments, the silicone-based ink may include a Pt-group metal curing agent involved in metal catalyzed hydrosilylation chemistry, at a concentration in the range of about 1 to about 1000 ppm, and preferably in a range of about 1 to about 100 ppm, and ideally, 1 to about 50 ppm. In some approaches, the silicone-based ink may include an effective amount of Pt-group metal to initiate a metal-catalyzed hydrosilylation chemistry curing reaction at pre-defined curing conditions, e.g. a pre-defined elevated temperature.

In some embodiments, the silicone-based ink may include an effective amount of an inhibitor for controlling a rate of curing by the curing agent under ambient atmospheric conditions. In some approaches, the inhibitor may be selected based on the curing agent. In some approaches, to maximize the printing time before cure (for example, delay the curing reaction as long as possible), an appropriate choice of a reaction inhibitor relative to the curing agent may be added to inhibit platinum-catalyzed curing chemistry, thereby providing a prolonged pot life duration for extended 3D printing sessions.

In some approaches, in the absence of the reaction inhibitor, the curing mechanism involving the polymerization reaction may proceed rapidly thereby solidifying the printed part within minutes. Thus, a metal-catalyst curing agent (for example Karstedt Pt catalyst), without reaction inhibitor may be undesirable for silicone-based inks involved in the printing of large parts.

In some approaches, the curing agent may induce curing in response to ultraviolet radiation. In other approaches, a curing agent may induce curing in response to free radical chemistry. In yet other approaches, the curing agent may induce curing in response to ionizing radiation. Known curing agents may be used in such approaches.

In some embodiments, the silicone-based ink may include a crosslinking agent as used in cure chemistry. For example, one hydrosilylation cure of siloxanes involves a poly(methylhydrosiloxane) containing additive in which the number of methylhydrosiloxane units along the polymeric or oligomeric chain may be greater than 3 per molecule. In various embodiments, through the implementation of dihydride chain extension chemistry, a silicone-based ink may be formed with very low hardness and stiffness that may be applicable to soft robotics and flexible electronics. In some approaches, a cross linking agent may be hydride terminated chain extension additives, for example, a hydride terminated PDMS-poly(hydrogenmethylsiloxane)(PHMS) copolymer. In other approaches, a short chain vinyl terminated PDMS additive may also be included to impart greater hardness to the cured material.

In some embodiments, the silicone-based inks described herein may be stable at low temperatures. Conventional PDMS-based materials exhibit relatively poor temperature stability beyond −45° C. due to PDMS crystallization. In some approaches, the replacement of PDMS with a random copolymer of PDMS and about 2-6 mole % diphenylsiloxane (DPS) may impart low temperature stability of silicone-based ink. For example, incorporation of the diphenyl moieties of DPS may inhibit crystallization of the PDMS chains at reduced temperature. In other approaches, short chain vinyl-terminated PDMS may be used with additional silica filler to decrease the average molecular weight between crosslinking sites thereby resulting in high hardness and stiffness of the 3D printed structure from the silicone-based ink.

In some embodiments, the silicone-based inks may be formulated to yield two-part materials in predetermined ratios. For example, Part A may include vinyl-terminated poly(dimethylsiloxane)-co-(diphenylsiloxane) macromer, a hydrophobic reinforcing filler, a rheology modifying additive, and a curing agent; and Part B may include a curing agent inhibitor, a crosslinker and an additional vinyl-terminated polydimethylsiloxane-co-diphenysiloxane macromer to create a 10:1 2-part A:B system. In some approaches, Part A may be assembled and then may be stored until use. Part B may be assembled and then stored until use. In other approaches, Part A and Part B may be assembled separately and used immediately.

FIG. 1 shows a method 100 for additive manufacturing with silicone-based ink, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 1 may be included in method 100, according to various embodiments. It should also be noted that any of the aforementioned features may be used in any of the embodiments described in accordance with the various methods.

According to one embodiment, the method 100 begins with step 102 involving adding a mixture to a cartridge for additive manufacturing, the mixture comprising a vinyl-terminated polydimethylsiloxane macromer, a hydrophobic reinforcing filler, and a rheology modifying additive. In this and other embodiments, the cartridge may be a nozzle. The mixture may be formed in the nozzle, where one or more of the components is added to the nozzle separately from the other components. A mixer may provide mixing within the nozzle. In another approach, the mixture may be premade and fed to the nozzle.

In some approaches, step 102 may include adding to the mixture, in the cartridge, a curing agent and/or a crosslinking agent. Alternatively, the curing agent and/or crosslinking agent may be part of a premade mixture that is fed through the cartridge.

In yet other approaches, step 102 may include adding to the mixture, in the cartridge, an effective amount of an inhibitor for controlling a rate of curing by the curing agent. Alternatively, the inhibitor may be part of a premade mixture that is fed through the cartridge.

Step 104 of method 100 involves extruding the mixture through the cartridge to form a structure. In various approaches, the presence of a rheology modifying additive imparts pseudoplasticity to the silicone-based ink such that the compression stress of the ink in the cartridge allows the ink to be extruded from the cartridge during 3D printing.

Step 106 of method 100 involves curing the mixture to at least a predefined extent. In various approaches, the 3D printed structure of silicone-based ink may be cured according to the curing agent present in the silicone-based ink. In some approaches, the temperature may be raised in order to initiate curing. In other approaches, UV irradiation may be used to initiate curing of the printed structure. In yet other approaches, free radical chemistry may be used to initiate curing of the printed structure. In various other approaches, curing may be initiated by methods known by one skilled in the art.

In some approaches of method 100, the formed structure may be a three-dimensional structure. In some approaches of method 100, the applied manufacturing is direct ink writing.

In one embodiment, a product of additive manufacturing with a silicone-based ink includes a vinyl-terminated siloxane macromer, a hydrophobic reinforcing filler, a rheology modifying additive, a curing agent, an inhibitor of the curing agent, and a crosslinking agent. In some approaches, the product may be a silicone-based three-dimensional (3D) structure.

In some embodiments, the product of additive manufacturing with silicone-based ink may have features about 100 µm or larger. Based on the ink viscosity smaller features may be created below 100 µm. In some embodiments, the product may have dimensional stability. In other words, the structure formed following 3D printing with silicone-based inks may retain pre-defined dimensions following curing of the structure, for example, there is minimal shrinkage.

In some embodiments, 3D printable silicone-based materials may be prepared with hardness values as low as Shore 10A (see Table 1 Experiments Section below), indicating penetration by the indenter of the durometer. A Shore durometer may be used to provide a measure of hardness in polymer, elastomer, and rubber material in terms of the material's resistance to indentation. The inclusion of dihydride chain extenders may serve to increase the molecular weight of the silicone polymer between crosslinking sites, yielding a material with reduced hardness and stiffness.

Figure 2:
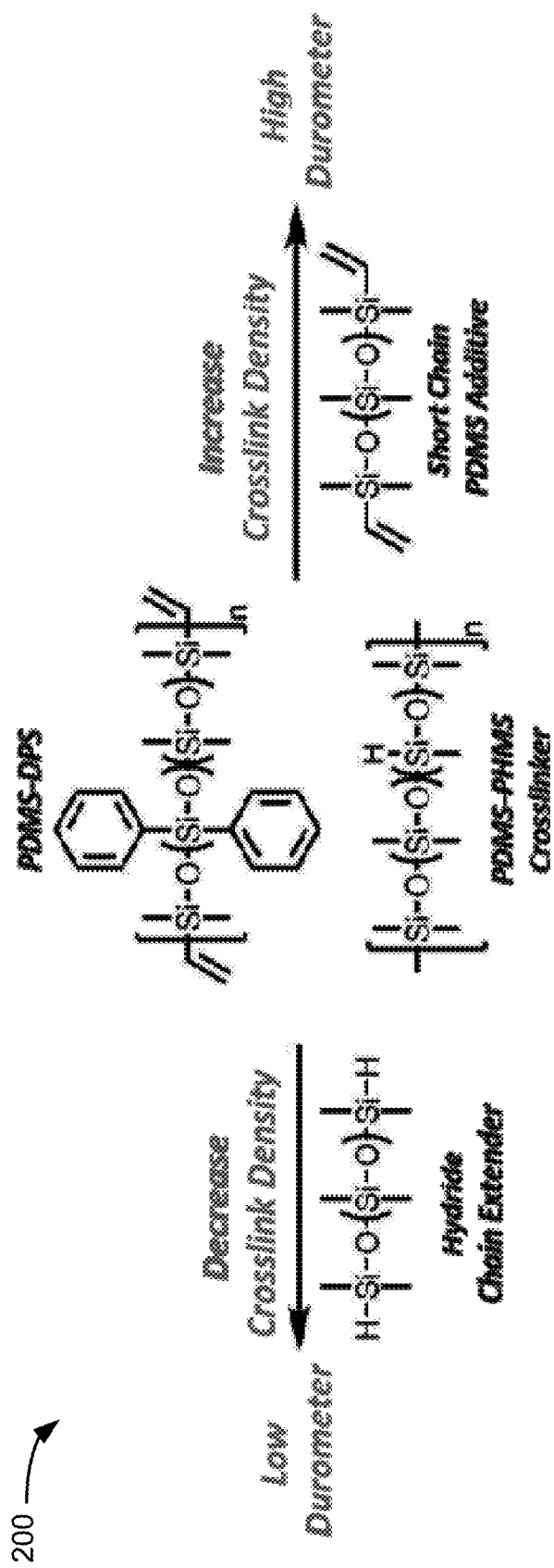
FIG. 2 is a schematic drawing of durometer silicone elastomers, according to various embodiments.

FIG. 2 depicts a structure 200 of variable durometer silicone elastomers, in accordance with one embodiment. As an option, the present structure 200 may be implemented in conjunction with features from any other embodiment listed herein, such as those described with reference to the other FIGS. Of course, however, such structure 200 and others presented herein may be used in various applications and/or in permutations which may or may not be specifically described in the illustrative embodiments listed herein. Further, the structure 200 presented herein may be used in any desired environment.

FIG. 2 is a simplified diagram that describes the formulation of variable durometer silicone elastomers. The core formulation components involved in custom stiffness tuning include a vinyl terminated PDMS-DPS polymer in conjunction with a hydride terminated PDMS-PHMS copolymer crosslinker, other components include silica fillers, rheological additives, inhibitors, and curing agents (for example, Pt catalysts). In some approaches, a reduction in the effective crosslink density and less stiffness (shifting to the left, Low Durometer) may be achieved through the use of hydride terminated chain extension additives. In other approaches, an increase in the effective crosslink density and greater stiffness (shifting to the right, High Durometer) may be achieved through the use of low molecular weight or short chain vinyl terminated PDMS additives, or those additives such as vinyl containing siloxane resins, such as siloxane resins built from M and Q units (MQ resins).

In some embodiments, the direct application of additive manufacturing using silicone-based inks with tunable stiffness may allow engineering of components and parts with specific properties including both low and high potential stiffness. In some approaches, silicone-based materials with differential stiffness may be 3D printed in tandem or simultaneously to generate unique objects with novel properties that are applicable to a wide-range of fields such as soft robotics and stretchable electronics.

Experiments

Material and Methods

A poly(diphenylsiloxane-dimethylsiloxane) copolymer (10,000 cSt, ca. 5.5 mole % diphenylsiloxane), PLY3-7560, was obtained from NuSil Technology (Bakersfield, Calif.). Platinumdivinyltetramethyldisiloxane complex (Karstedt's catalyst, low color, ca. 2%) in xylene was supplied by Gelest, Inc (Morrisville, Pa.). (SIP6831.2LC), as were DMS-H11 (hydride terminated PDMS, 10 cSt), HMS-053 (trimethyl terminated [4-6% methylhydrosiloxane] dimethylsiloxane, 1000 cSt), DMS-V05 (divinyl PDMS, 8 cSt), and HMS-H271 (hydride terminated [30% methylhydrosiloxane] dimethylsiloxane copolymer, 60 cSt). 1-ethynyl-1-cyclohexanol (ETCH) was supplied by Sigma-Aldrich (St. Louis, Mo.). Bluesil™ Thixo Add 22646 was supplied by Elkem Silicones (Oslo, Norway). Aerosil® R812S and Sipernat® D13 were supplied by Evonik Industries (Essen, Germany), SIS 6962.1M30 was obtained from Gelest, and Cabosil EH5 was obtained from Cabot Corp (Boston, Mass.). All materials were used as-is without further purification. Formulations were prepared using a Flacktek DAC 150.1 FVZ-K SpeedMixer™ (Landrum, S.C.) for compounding. Catalyst cure temperatures and ink thermal response values were measured using a TA Instruments Discovery DSC (New Castle, Del.) differential scanning calorimeter using Tzero® aluminum sample pans (NDS Surgical Imaging, Sunnyvale, Calif.). Yield stress, viscosity, pot life measurements, and cure profiles were obtained with a TA Instruments AR2000EX rheometer equipped with a cross-hatched 25 mm Peltier parallel plate under a 1 mm sample gap spacing.

Once formulated, all silicone-based inks were filtered (pressurized air, 90 psi) through a Swagelok 140 µm mesh filter (Solon, Ohio) into 30 mL syringe barrels (Nordson EFD Optimum, East Providence, R.I.) and centrifuged (Nordson EFD ProcessMate 5000) to eliminate entrapped air. A flat-ended piston was inserted to seal the rear of the syringe; whereas, the syringe tip was equipped with a smooth-flow tapered nozzle (250 µm inner diameter) via luer-lock. The syringe was attached to a positive-displacement dispenser (Ultra 2800, Nordson EFD), which supplied the appropriate displacement to extrude ink through the nozzle. The syringe system was subsequently affixed to the z-axis of a custom Aerotech air-bearing gantry xy open frame movement stage, which was controlled via an A3200 controller through an Aerotech A3200 CNC operator interface (v5.05.000) (Aerotech Consumer Aerospace, Pittsburgh, Pa. G-code instructions were programmed and run through the controller software to generate continuous FCT lattice structures with a 50% effective density. The lattice structures were printed onto silicon wafers with each layer of parallel filaments being printed orthogonal to the previous layer, yielding an FCT structural arrangement. The printed lattices were cured in a Yamato ADP300C vacuum drying oven (Yamato Scientific America, Inc, Santa Clara, Calif.).

Shore hardness values were obtained by preparing solid "pucks" of silicone material that were cured at 150° C. for 12-16 hours. Durometer values were measured at several different locations with a PTC Instruments Model 408 Type A Durometer (Los Angeles, Calif.). Printed lattice structures were sectioned with a razor blade and cross-sectional images were obtained with a Zeiss SteREO Discovery.V12 microscope (Zeiss, Dublin, Calif.) equipped with an Axiocam ICc 5 camera and analyzed with AxioVision software to measure the diameters of the printed filaments, individual layer heights, and total heights of the printed FCT lattices.

Example Preparation of MD-10A Silicone-Based Ink

A Flacktek Max 100 cup was charged with NuSil PLY3-7560 silicone polymer (24.6 g), platinum catalyst (4 ppm), and inhibitor (ETCH, 400 ppm); the components were mixed with a Flacktek DAC 150.1 FVZ-K SpeedMixer™ at 3500 rpm for 20 seconds. Aerosil® R812S fumed silica (4.2 g) was subsequently added to the mixture and mixed at 3500 rpm for 20 seconds; the sides of the cup were scraped, and the blend was speed-mixed again under the same conditions. Bluesil™ Thixo Additive 22646 (0.3 g) was added to the mixture, followed by speed-mixing at 3500 rpm for 20 seconds. Lastly, Gelest HMS-H271 (0.221 g) and Gelest DMS-H11 (0.644 g) were added and speedmixed into the blend at 3500 rpm for 20 seconds. The sides of the cup were scraped, and the dispersion blend was speed-mixed again under the same conditions, yielding a viscous translucent polysiloxane ink.

TABLE 1

3D printable MD-XA silicone inks formulation details.

| Components | MD-10A | MD-25A | MD-45A | MD-55A | MD-60A | MD-70A |
|---|---|---|---|---|---|---|
| NuSil PLY3-7560 | 82% | 81.20% | 76.50% | 71.50% | 67% | 56% |
| Gelest DMS-V05 | — | — | 0.50% | 3.50% | 5% | 9.50% |
| Karstedt's Catalyst | 4 ppm | 4 ppm | 4 ppm | 4 ppm | 4 ppm | 4 ppm |
| ETCH[a] | 400 ppm | 400 ppm | 400 ppm | 400 ppm | 400 ppm | 400 ppm |
| Aerosil ® R812S | 14% | 18% | 12% | 12% | 12% | — |
| Sipernat ® D13 | — | — | 10% | 12% | 15% | 33.50% |
| Bluesil ™ Thixo Additive 22646 | 1% | 0.60% | 1% | 1% | 1% | 1% |
| Gelest DMS-H11 | 0.875 eq.[b] | — | — | — | — | — |
| Gelest HMS-H271 | 0.75 eq.[b] | 1 eq.[b] | 2 eq.[b] | 2 eq.[b] | 2 eq.[b] | 2 eq.[b] |
| Shore A Durometer | 10A | 25A | 45A | 55A | 60A | 70A |

[a] 1-ethynyl-1-cyclohexanol.
[b] Equivalents are per each equivalent reactive vinyl group within each formulation.

As shown in Table 1, a 3D printable silicone-based ink was prepared with a reduced silica filler loading (14 wt. % HMDZ-treated silica) and cured using 0.75 equivalents (hydride:vinyl) of a dihydride chain extender and 0.75 equivalents of silane crosslinker, which was sufficient to decrease the measured durometer to Shore 10A, (named "modified durometer 10A" or MD-10A).

Evidence of Pseudoplasticity

Analysis of shape retention behavior may be used to evaluate the relationship between properties of silicone-based ink materials. In brief, using a model of Hershel-Bulkley material moving through a cylindrical nozzle, an extruded core material having properties characteristic of an unyielded silicone-based ink based may be subjected to beam deflection analysis. Equation 1 shows the relationship of the elastic behavior of an ink to a desired beam deflection, in which γ represents the specific weight of an ink and s represents the beam length (L) to strand diameter (D) ratio, L/D.

$$G' \gtrsim 1.4 \gamma s^4 D \quad \text{Equation 1}$$

According to Equation 1, the 3D printable silicone-based inks may possess G' values several orders of magnitude higher than that recommended for a strand deflection of ≤0.05 D. Thus, in some approaches, the deposition speed may be tuned to print lower G' inks for 3D printed architectures. Moreover, in come approaches, custom silicone-based ink formulations may support higher density fillers for 3D printed architectures.

FIG. 3A shows the oscillatory stress (Pa, x-axis) of storage modulus (G', y-axis) values for silicone-based inks containing various levels of rheological additive. Yield stress was defined as the oscillatory stress corresponding to 90% of the storage modulus plateau. Increasing the rheological additive content led to an increase in ink yield stress to 410 Pa for an ink containing 0.25 wt. % of a rheological additive (•), 515 Pa for 0.50 wt. % of a rheological additive (▲), and 540 Pa for 1.0 wt. % of a rheological additive (▼) as the degree of pseudoplasticity increased. In the absence of a rheological modifier (■), no pseudoplasticity was observed; instead, the measured storage modulus (G') was always less than that of the loss modulus (G"). However, when the rheological additive was added in the presence of treated silica filler, a highly pseudoplastic material with a large yield stress was obtained.

FIGS. 3B and 3C show a lattice 8-layer structure formed by 3D printing with a silicone-based ink with 1.0 wt. % rheological additive (FIG. 3B) and with silicone-based ink without rheological additive (G">G') (FIG. 3C). Mechanistically, without wishing to be bound by any theory, it is believed the pseudoplasticity was due to the formation of a stable three-dimensional network between silica filler particles and the rheological additive via hydrogen bonding and potential van der Waals interactions.

FIG. 3D is a plot of the effect of treated reinforcing silica filler (with a constant 1.0 wt. % rheological additive) on the observed yield stress of DIW inks. At a rheological additive concentration of 1.0 wt. %, loading of increasing concentrations of treated silica were studied to determine the appropriate quantity of silica necessary to print soft 3D materials. Oscillatory rheology was performed, demonstrating that at a relatively low loading of HMDZ-treated silica (10 wt. %, ■), the measured yield stress was 130 Pa, a value deemed too low for our 3D printing processes; yield stress values increased to 400 Pa, 545 Pa, and 690 Pa for silicone-based formulations comprising, 15 wt. % (□), 18 wt. % (▲), and 20 wt. % (*) HMDZ-treated silica, respectively. Thus, it was demonstrated that the rheology of the ink formulations may be tuned through an adjustment in silica loading.

Pt-Catalyzed Hydrosilylation Chemistry

A low color Karstedt Pt catalyst was selected as a platinum catalyst complex and 1-ethynyl-1-cyclohexanol (ETCH) was selected as the reaction inhibitor. To obtain inks with a long printable time windows, 300-400 ppm ETCH was added for 4-5 ppm Pt catalyst to sufficiently inhibit silicone curing while still providing rapid curing at elevated temperatures (ca. 125-150° C.).

Figure 4:
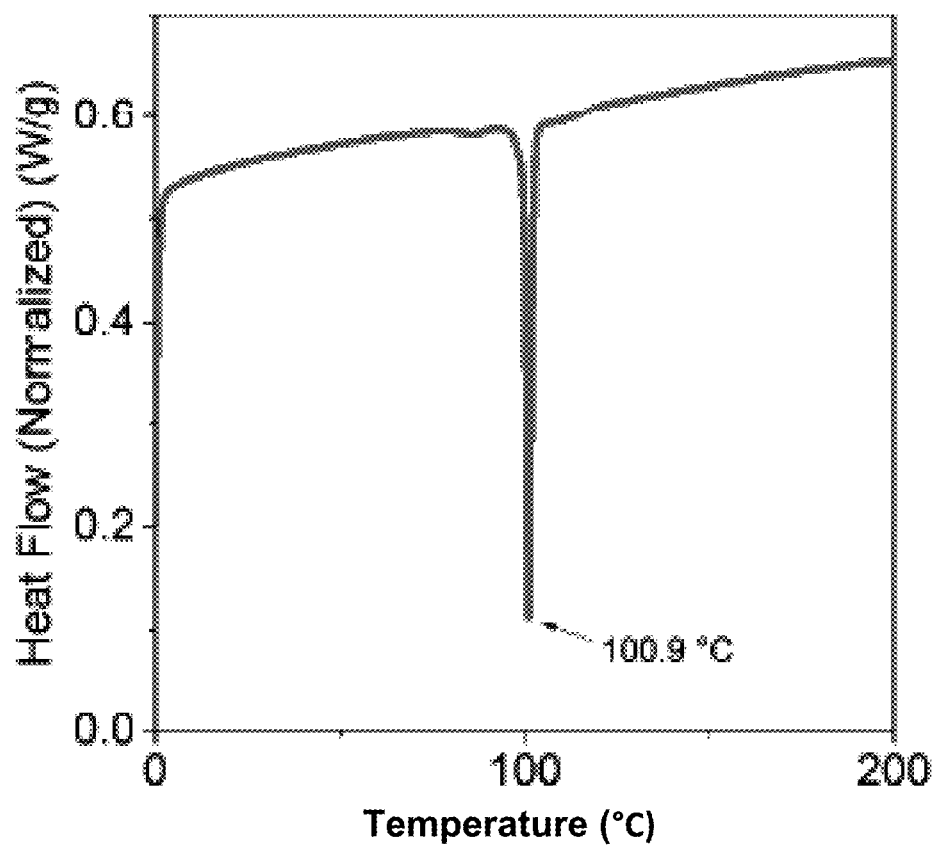
FIG. 4 is a plot of a normalized temperature sweep for a polysiloxane matrix, according to one embodiment.

FIG. 4 shows a normalized temperature sweep (x-axis) for a polysiloxane matrix containing 4 ppm Pt-Karstedt's catalyst and 500 ppm ETCH inhibitor in which the normalized heat flow of the polysiloxane matrix was measured (y-axis, W/g). As shown in FIG. 2, the onset of curing is indicated by the endothermic peak at 100.9° C.

Figure 5:
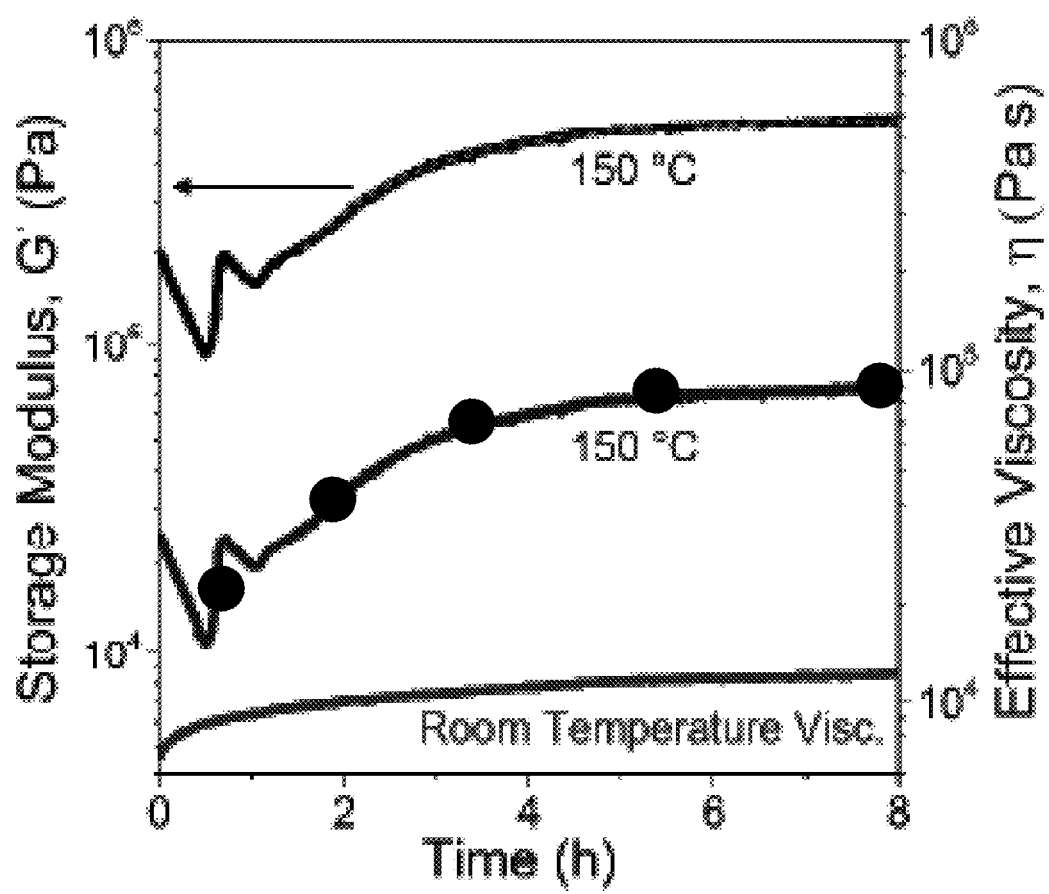
FIG. 5 is a plot of the oscillatory rheology of silicone-based inks at variable temperatures, according to one embodiment.

To analyze the working print time, a 3D printable silicone-based composite was prepared in the presence of 4 ppm Pt-Karstedt's catalyst, 400 ppm ETCH, and 1.0 equivalent of silane crosslinker. FIG. 5 shows the oscillatory rheology a 3D printable silicone-based composite at room temperature and at 150° C. over time, 0 to 8 hours (x-axis). From this analysis, the effective viscosity (right y-axis) of the silane-based composite remained stable with low viscosity and long pot life at room temperature for greater than 8 hours (bottom curve), whereas at 150° C., the effective viscosity curve (•) showed curing with a dramatic rise in viscosity could be initiated within the first hour of elevated temperature. Analysis of the storage modulus (left y-axis), showed a similar dramatic patterned curve at 150° C. (uppermost curve). Thus, this analysis showed printing with silicone-based inks as described may be stored over 24 hours after preparation; and storing inks in a cold environment may further prolong the pot life.

Figure 6A:
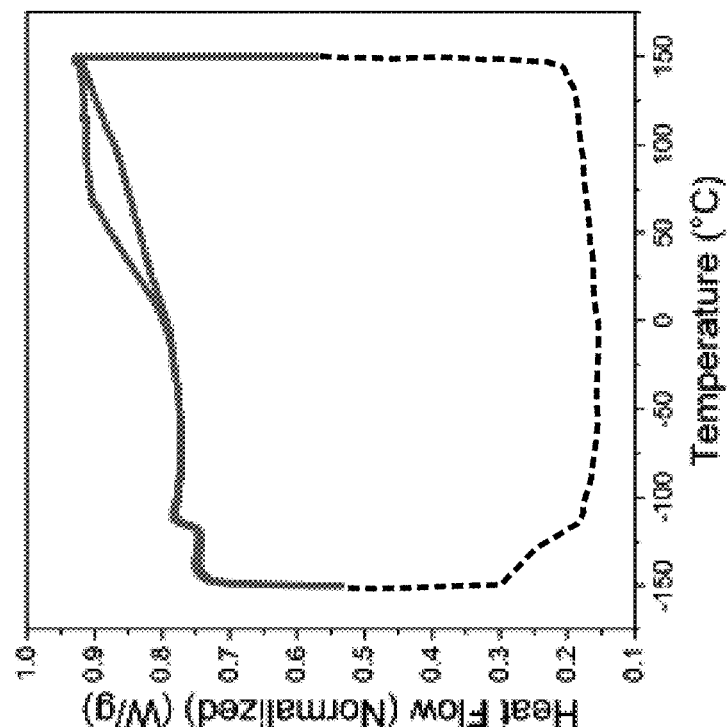
FIG. 6A is the DSC heating profile curves of silicone-based ink, according to one embodiment.
Figure 6B:
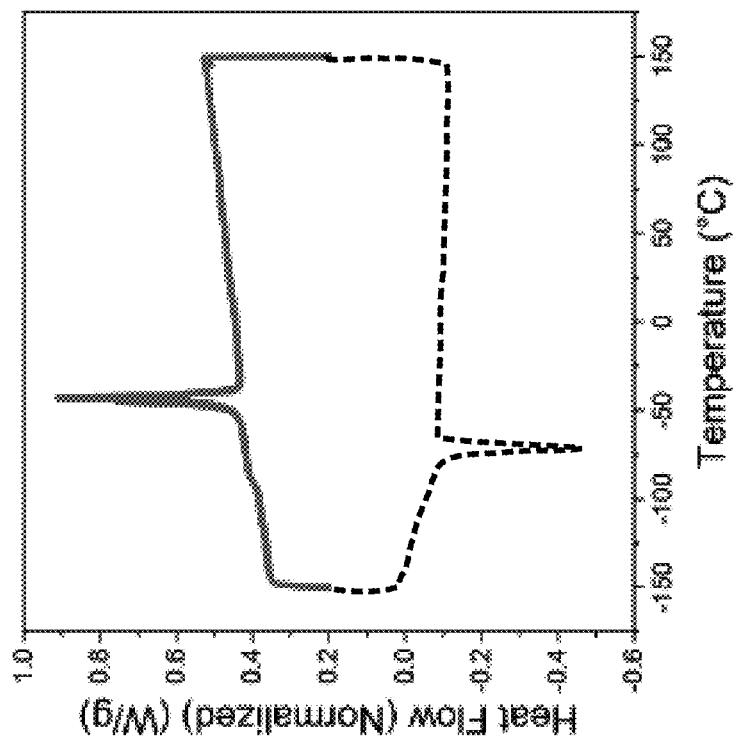
FIG. 6B is the DSC heating profile curves of standard PDMS material, according to one embodiment.

Silicone-Based Inks with Tunable Stiffness 3D printable silicone-based inks were prepared following Shore hardness durometer values 10A, 25A, 45A, 55A, 60A, and 70A, which were named MD-XXA, where XX corresponds to the Shore hardness. The complete formulation details for each material is shown on Table 1 (see above). FIGS. 6A and 6B show the DSC heating profiles for standard PDMS material (FIG. 6B) and polysiloxane ink MD-70A (FIG. 6A). The DSC heating profile involved a temperature ramp (solid curve) from −150° C. to 150° C. at a rate of 10° C. ° C./minute, followed by an isothermal hold for 1 minute and a cooling ramp (dashed curve) from 150 to −150° C. at a rate of 10° C./minute, followed by an isothermal hold for 1 min prior to a final temperature ramp (solid curve) from −150° C. to 150° C. at a rate of 10° C./minute.

FIG. 6B depicts the normalized DSC curve for a standard PDMS material, showing characteristic crystallization peak (dashed curve) and melting peak (solid curve). In contrast, FIG. 6A shows a normalized DSC curve for a characteristic variable stiffness polysiloxane ink (MD-70A) demonstrating the absence of crystallinity in the MD-70 material as a result of the use of the poly(dimethylsiloxane)-co-(diphenylsiloxane) macromer.

3D Printed Structures from Silicone-Based Ink

Figure 7B:
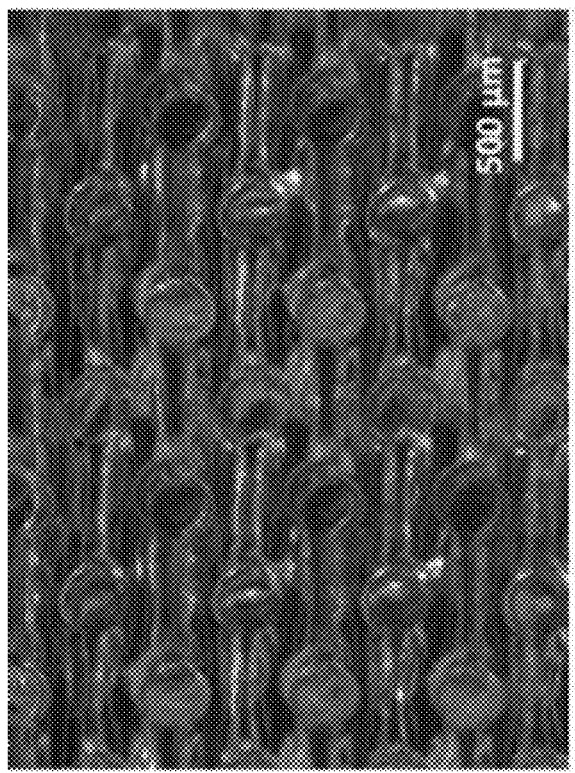
FIG. 7A-7B are cross-sectional images of lattice structures of silicone-based inks, according to various embodiments.
Figure 7A:
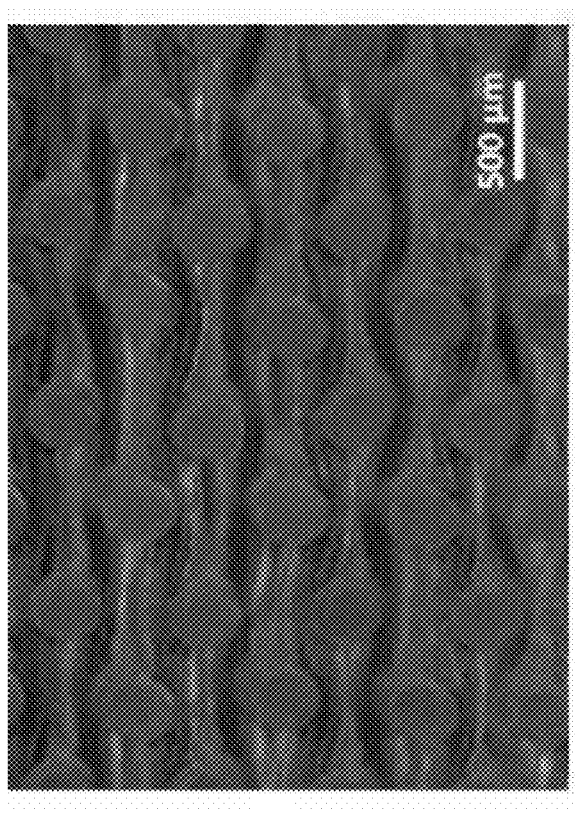

A representative cross-sectional image of lattice structures from 3D printing with silicone-based ink MD-10A is shown in FIG. 7A and with silicone-based ink MD-70A is shown in FIG. 7B. Each structure resulted in 28 printed layers with an FCT (face centered tetragonal) geometry, 1000 μm center-to-center spacing, and a 250 μm filament diameter.

Stiffness Tunability of Silicone-Based Ink for 3D Printing

Tensile and compression testing of silicone-based ink demonstrated stiffness tunability. FIGS. 8A-8D show the tensile and compression results for silicone-based inks MD-10A, MD-45A, and MD-70A. FIG. 8A shows a plot of tensile stress (y-axis) versus tensile strain (x-axis) of silicone-based inks MD-70D (■), MD-45A (•), and MD-10A (solid black line). The softest material, MD-10A, featured a Young's modulus of 0.40 MPa with an average elongation at break of 528%. MD-45A (•) featured a Young's modulus of 3.61 MPa with an average elongation at break 362%. The hardest material, MD-70A (■) featured a Young's modulus of 11.51 MPa with an average elongation at break of 77%.

The relative compressive performance of the silicone-based inks was measured by applying a cyclic compressive load of 2000 kPa to an 8 layer FCT lattice (500 μm center-to-center spacing, 250 μm filament diameter). FIG. 8B shows a summary of the compressive load deflection curves and peak compressive strain values of 59.2%, 56.6%, and 48.1% were measured after 3 successive load-unload cycles for MD-10A (solid line), MD-45A (•), and MD-70A (■), respectively. These results demonstrated hysteresis with regard to stable cyclic compressive loads.

A physical demonstration of the large difference in material properties at either end of the hardness spectrum is shown in FIGS. 8C and 8D. Observable variable stiffness of 3D printed silicone lattices evident through compression loading with 1200 g static weighted samples for MD-10A (FIG. 8C) and MD-70A (FIG. 8D);

FIG. 8E depicts the demonstration of the potential for soft robotic applications through the printing of a pneumatically-driven gripper comprised solely of MD-10A and MD-70A. An air-driven soft robotic actuator was 3D printed as a single component. Pressurization of the hollow interior channels comprising soft silicone (MD-10A) exhibiting high strength and low stiffness were able to expand and deflect the reinforcing frame of the actuator, which was printed with a stiff silicone material (MD-70A). Various forms of bio-inspired locomotion and bio-mimicry in the form of soft robotics applications could thus be engineered in a similar fashion.

In Use

Functional 3D printed soft materials have a diverse range of applications and potential within the fields of materials engineering, bioengineering, and electronics. Through precise control over the deposition of highly-engineered viscoelastic inks in the form of continuous filaments, complex 3D architectures may be additively fabricated, layer-by-layer, to generate parts that are directly applicable to cutting-edge technologies, including aerospace and defense, microwave optics, supercapacitors, piezoelectrics, and mechanical metamaterials. In particular, 3D printed silicones may be well suited to soft materials applications including high-performance foams and cellular-solids, soft robots, biomedical devices and biological scaffolds, and flexible and stretchable electronics. It would be desirable to tune silicone-based printable material to form 3D printed silicone structures variable stiffness.

Various embodiments described herein may be applied to 3D engineered cellular solids, foam structures, shock-absorbing cushions, soft robotics, biomedical devices (biocompatibility), prosthetics, metamaterials, flexible electronics, and optic systems. Additionally, the low temperature performance, up to negative 100° C., may be suitable to applications in extreme conditions such as space.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A silicone-based ink for extrusion of continuous filaments, the ink comprising:
   a vinyl-terminated diphenyl siloxane macromer;
   a treated silica hydrophobic reinforcing filler;
   a rheology modifying additive selected from the group consisting of: a silicone polyether, glycerol, 2-propanol, and a combination thereof;
   a curing agent;
   an effective amount of an inhibitor for controlling a rate of curing by the curing agent;
   a crosslinking agent, wherein the crosslinking agent is a hydride terminated copolymer; and
   a crosslinking additive, wherein the crosslinking additive is a hydride chain extender, wherein the crosslinking additive and the crosslinking agent have different molecular structures from each other, wherein the crosslinking additive is configured to decrease a crosslinking density of the silicone-based ink.

2. The ink as recited in claim 1, wherein the curing agent induces curing in response to catalyst-mediated hydrosilylation chemistry.

3. The ink as recited in claim 1, wherein the curing agent induces curing in response to ultraviolet radiation.

4. The ink as recited in claim 1, wherein the curing agent induces curing in response to free radical chemistry.

5. The ink as recited in claim 1, wherein the vinyl-terminated diphenyl siloxane macromer has a viscosity in a range of about 500 centistoke and about 50,000 centistoke.

6. The ink as recited in claim 1, wherein the treated silica hydrophobic reinforcing filler is a treated silica having capped silanol groups.

7. The ink as recited in claim 6, wherein the treated silica has a surface area in a range of about 50 $m^2$/g and about 250 $m^2$/g.

8. The ink as recited in claim 6, wherein the treated silica is hexamethyldisilazane-treated silica.

9. The ink as recited in claim 1, wherein the rheology modifying additive is the silicone polyether.

10. The ink as recited in claim 1, wherein the ink is a pseudoplastic, non-Newtonian fluid.

11. The ink as recited in claim 1, wherein the treated silica has a surface area in a range of about 100 $m^2$/g and about 200 $m^2$/g.

12. The ink as recited in claim 1, wherein the ink is stable without crystallinity at temperatures down to −150° C.

13. The ink as recited in claim 1, wherein a concentration of the rheology modifying additive is in a range of about 0.2 wt % to about 1.0 wt % of total ink.

14. The ink as recited in claim 1, wherein the treated silica hydrophobic reinforcing filler and the rheology modifying additive are different materials.

15. A method of additive manufacturing with silicone-based ink, the method comprising:
   adding a first mixture to a cartridge for additive manufacturing, the first mixture comprising a vinyl-terminated diphenyl siloxane macromer, a treated silica hydrophobic reinforcing filler, and a rheology modifying additive;

extruding a continuous filament of the first mixture through the cartridge to form a first layer in an x-y plane;

depositing by extrusion of the continuous filament in the x-y plane each of a plurality of subsequent layers above the first layer in a z-direction perpendicular to the x-y plane, wherein the continuous filament forms a three dimensional structure having the plurality of layers; and after forming the entire structure having the plurality of layers, curing the mixture to at least a predefined extent.

16. The method as recited in claim 15, further comprising adding to the mixture in the cartridge, a curing agent and a crosslinking agent.

17. The method as recited in claim 16, further comprising adding to the mixture, in the cartridge, an effective amount of an inhibitor for controlling a rate of curing by the curing agent.

18. The method as recited in claim 15, wherein a portion of at least one layer is formed from a second mixture, wherein a crosslinking density of the second mixture and a crosslinking density of the first mixture are different.

19. A product of extrusion-based printing with a silicone-based ink, the product comprising:

an uncured three-dimensional structure comprising a continuous filament of a first material comprising a vinyl-terminated diphenyl siloxane macromer, a hydrophobic reinforcing filler, and a rheology modifying additive, wherein the continuous filament forms each of a plurality of layers, wherein each of the plurality of layers is deposited in a layer-by-layer pattern during the printing, wherein the plurality of layers are arranged in a stack according to a predefined geometric pattern, wherein the uncured three-dimensional structure is configured to be cured after formation of the entire three-dimensional structure.

20. The product as recited in claim 19, wherein the product is a silicone-based three-dimensional structure, wherein the filaments of the three-dimensional structure have a diameter greater than about 100 microns.

21. The product as recited in claim 19, comprising a first layer and a second layer, wherein continuous filaments of the second layer are different than continuous filaments of the first layer, wherein the second layer is in a z-direction perpendicular to an x-y plane of the first layer.

22. The product as recited in claim 19, wherein a portion of at least one of each of the plurality of layers comprises a continuous filament comprising a second material, wherein a hardness of the second material and a hardness of the first material are different.

* * * * *